US008300801B2

(12) United States Patent
Sweeney et al.

(10) Patent No.: US 8,300,801 B2
(45) Date of Patent: Oct. 30, 2012

(54) SYSTEM AND METHOD FOR TELEPHONE BASED NOISE CANCELLATION (75) Inventors: Jeffrey Michael Sweeney, Olathe, KS (US); Kelsyn Donel Seven Rooks, Sr., Overland Park, KS (US); Michael Clayton Robinson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 990 days.

(21) Appl. No.: 12/146,876

(22) Filed: Jun. 26, 2008

(65) Prior Publication Data
US 2009/0323925 A1 Dec. 31, 2009

(51) Int. Cl.
*H04M 9/08* (2006.01)
*H04M 1/00* (2006.01)
*H04B 1/38* (2006.01)

(52) U.S. Cl. ......... 379/406.05; 379/392.01; 379/406.03; 704/233; 704/246; 704/273; 455/570

(58) Field of Classification Search ............ 379/392.01, 379/406.03, 406.05; 375/296; 704/233, 704/246, 273
See application file for complete search history.

(56) References Cited

U.S. PATENT DOCUMENTS

| 5,526,421 | A |   | 6/1996  | Berger et al. |
|-----------|---|---|---------|---------------|
| 5,937,070 | A | * | 8/1999  | Todter et al. ................ 381/71.6 |
| 6,097,820 | A | * | 8/2000  | Turner ......................... 381/94.3 |
| 7,088,828 | B1|   | 8/2006  | Bradford et al. |
| 2002/0131581 | A1 |   | 9/2002 | Wittke et al. |
| 2002/0131582 | A1 | * | 9/2002 | Oosterveen .............. 379/406.01 |
| 2003/0177006 | A1 | * | 9/2003 | Ichikawa et al. ............. 704/231 |
| 2004/0052384 | A1 | * | 3/2004 | Ashley et al. ................ 381/94.1 |
| 2004/0066940 | A1 | * | 4/2004 | Amir ............................ 381/94.2 |
| 2004/0196984 | A1 | * | 10/2004 | Dame et al. .................. 381/71.1 |
| 2004/0246862 | A1 | * | 12/2004 | Cho et al. .................... 369/59.22 |
| 2005/0027520 | A1 | * | 2/2005 | Mattila et al. ................. 704/228 |
| 2005/0065778 | A1 |   | 3/2005 | Mastrianni et al. |
| 2006/0029212 | A1 | * | 2/2006 | Short et al. .............. 379/388.03 |
| 2007/0165834 | A1 | * | 7/2007 | Redman et al. ............... 379/395 |
| 2008/0118081 | A1 |   | 5/2008 | Chang |
| 2009/0060216 | A1 |   | 3/2009 | Sweeney et al. |
| 2009/0061882 | A1 |   | 3/2009 | Sweeney et al. |

OTHER PUBLICATIONS

Non-Final Office Action date mailed Jun. 21, 2010 in U.S. Appl. No. 11/897,906.
Non-Final Office Action date mailed Jun. 23, 2010 in U.S. Appl. No. 11/897,762.
Response filed Sep. 21, 2010 for U.S. Appl. No. 11/897,906.
Response filed Sep. 23, 2010 for U.S. Appl. No. 11/897,762.
U.S. Appl. No. 11/897,762; Final Office Action dated Feb. 10, 2012; 21 pages.
U.S. Appl. No. 11/897,906; Notice of Allowance dated Feb. 17, 2012; 12 pages.
U.S. Appl. No. 11/897,906; Supplemental Notice of Allowance dated Apr. 9, 2012; 3 pages.
U.S. Appl. No. 11/897,762 ; Final Office Action dated Feb. 10, 2012; 21 pages.

* cited by examiner

*Primary Examiner* — Fan Tsang
*Assistant Examiner* — Jeffrey Lytle
(74) *Attorney, Agent, or Firm* — Swanson & Bratschun, L.L.C.

(57) ABSTRACT

A system and method for enhancing communications through a phone. A voice communication is received from a user of the phone. A secondary signal is received from an environment in proximity to the phone. The secondary signal is processed to determine an inverse signal in response to receiving the secondary signal. The inverse signal is combined with the voice communication and the secondary signal to destructively interfere with the secondary signal for allowing a receiving party to more effectively communicate with the user.

20 Claims, 7 Drawing Sheets

SYSTEM AND METHOD FOR TELEPHONE BASED NOISE CANCELLATION

CROSS REFERENCE TO RELATED APPLICATION

This application claims priority from co-pending U.S. application Ser. No. 11/897,762 filed Aug. 31, 2007, entitled: System and Method for Localized Noise Cancellation, the entire teachings of which are incorporated by reference.

BACKGROUND

The use of and development of communications has grown nearly exponentially in recent years. The growth is fueled by larger networks with more reliable protocols and better communications hardware available to service providers and consumers. The increased use of communications devices has increased the number of conversations that occurs at work, at home, and in other locations that may have a large amount of background noise.

In most cases, a user expects to be able to effectively communicate with one or more receiving parties regardless of the environment or circumstances under which the call is made or received. As a result, the user or receiving party may be frustrated when their conversation is full of background noise, such as kids, pets, office noise, other conversations, and other forms of background noise. In many cases, the users may be unable to avoid the background noise by changing locations, closing a door or by taking other preventative steps. Despite the issues associated with background noise, the demands of modern life dictate that verbal conversations will continue to be carried on in all types of forums, environments, and settings.

SUMMARY

One embodiment includes a system and method for enhancing communications through a phone. A voice communication may be received from a user of the phone. A secondary signal may be received from an environment in proximity to the phone. The secondary signal may be processed to determine an inverse signal in response to receiving the secondary signal. The inverse signal may be combined with the voice communication and the secondary signal to destructively interfere with the secondary signal for allowing a receiving party to more effectively communicate with the user.

Another embodiment includes a phone for reducing background noises. The phone may include one or more microphones operable to receive voice communications from a user and background noises from an environment of the phone. The phone may also include a signal generator in communication with the microphone operable to process the background noises to determine an inverse signal of the background noises, the signal generator combines the voice communications, the background noises, and the inverse signal into a combined signal, and the signal generator transmits the combined signal to a receiving party.

Yet another embodiment includes a phone for reducing background noises. The phone may include a processor operable to execute a set of instructions and a memory in communication with the processor. The memory may be operable to store the set of instructions. The set of instructions may be operable to receive a voice communication from a user of the phone, receive a secondary signal from an environment in proximity to the phone, process the secondary signal to determine an inverse signal in response to receiving the secondary signal, and combine the inverse signal with the voice communication and the secondary signal to destructively interfere with the secondary signal for allowing a receiving party to more effectively communicate with the user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for enhancing communications through a phone utilizing noise cancellation. In one embodiment, a voice conversation between a user and a receiving party may be enhanced by using noise cancellation to destructively interfere with background noises picked up by the phone during the call. The phone is a communications device for carrying on voice conversations. The phone may include a plain old telephone service (POTS) telephone or standard phone, WiFi® phone or a voice over Internet Protocol (VoIP) phone. The voice communications is received as well as a secondary signal or background noise. An inverse signal is generated by the phone and aggregated to the signal picked up by the phone to eliminate or reduce the background noise. As a result, the user and the receiving party are able to more effectively communicate.

Figure 1:
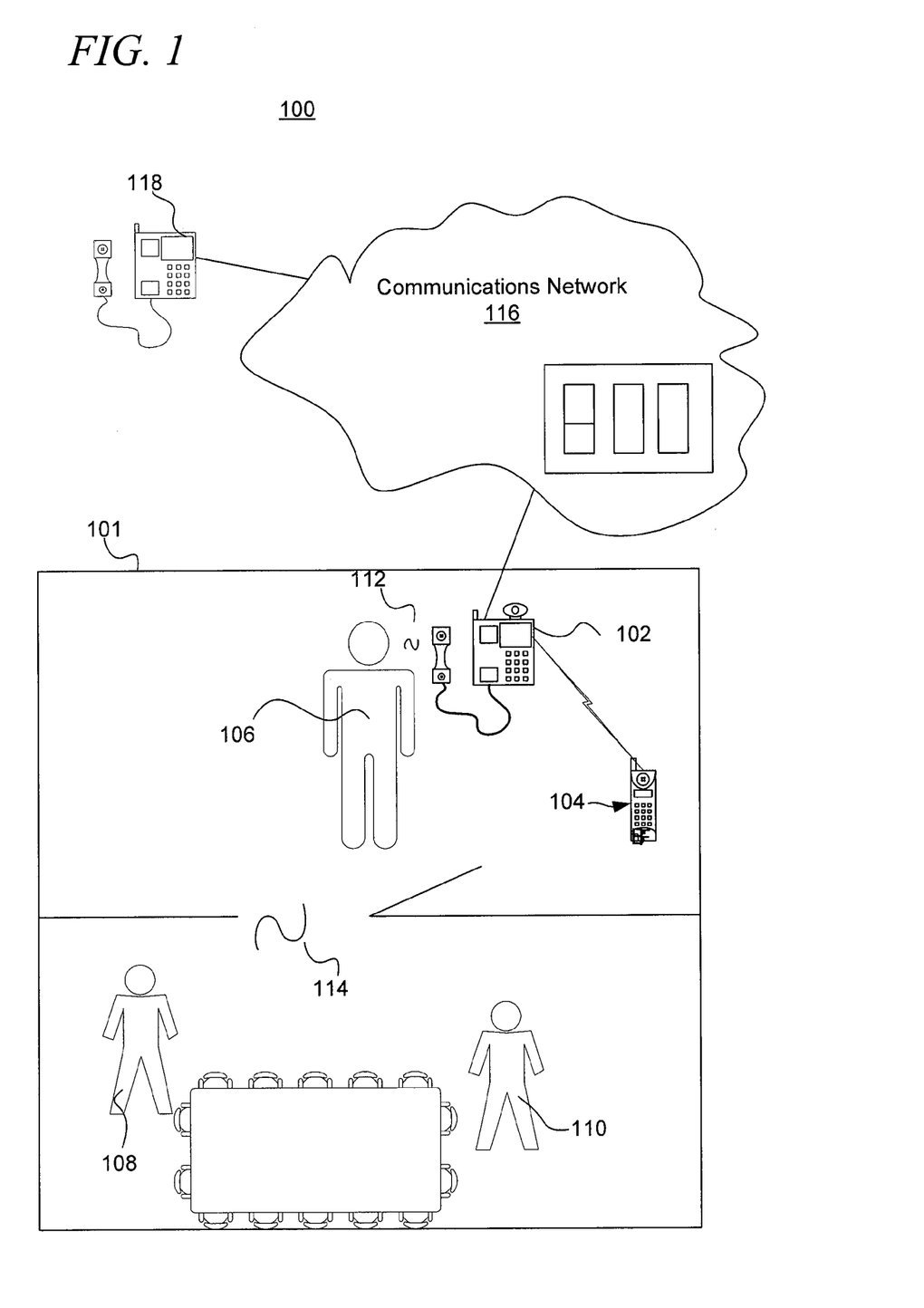
FIG. 1 is a pictorial representation of a communications environment in accordance with an illustrative embodiment.

FIG. 1 is a pictorial representation of a communications environment in accordance with an illustrative embodiment. FIG. 1 describes one embodiment of a communications environment 100. The communications environment 100 may include a home 101, a phone 102, a cordless handset 104, a user 106, individuals 108 and 110, a voice communications 112, background noises 114, a communications network 116, and a receiving party 118.

As shown in FIG. 1, the home 101 is a building, office space, dwelling or other location. However, the home 101 may be any location, such as a restaurant, building or other environment suitable for a user to carry on a conversation. Illustrative embodiments may be particularly useful in an open office environment or call center. The home 101 illustrates an area or location in which a phone enabled for noise cancellation may be utilized to enhance effective verbal or telephonic communications between the user 106 and the receiving party 118. The receiving party 118 represents the individual and equipment that may be utilized to communicate with the user 106 through the phone 102.

As shown, the phone 102 may be surrounded by or positioned in areas in which noises, sounds, speech, and conversations may be generated in the form of background noises 114. For example, the individuals 108 and 110 may be carrying on conversations amongst themselves, on the telephone, utilizing noise producing equipment, eating or may otherwise be generating sound, noises and/or speech that constitute the background noises 114. The noise and speech in the form of audio signals may propagate through the air from the individuals 108 and 110 and be received by a microphone of the phone 102.

In one example, the background noises 114 may interfere with the communications between the user 106 and receiving party 118. As a result, the individuals 110 and 112 may be unable to effectively concentrate, convey words and messages or otherwise communicate with one another. Effective communication between the user 106 and receiving party 118 may be necessary in order to convey thoughts and ideas, perform business transactions, and maintain effective social communications.

In one embodiment, the phone 102 may automatically generate an inverse or response signal in order to destructively interfere with the background noises 114 received by the phone 102. In another embodiment, the user 106 may be required to provide user input to activate a noise cancellation feature of the phone 102. In another embodiment, the noise cancellation feature of the phone 102 may be activated based on time of day, caller identification information, the user 106 utilizing the phone 102, a noise sensor measured in decibels (dB) or motion sensors. For example, if a sensor in communication with the phone 102 detects sound or motion, the noise cancellation feature may be activated because of the probability that the phone 102 is picking up the background noises 114 in addition to the voice communications 112.

Figure 2:
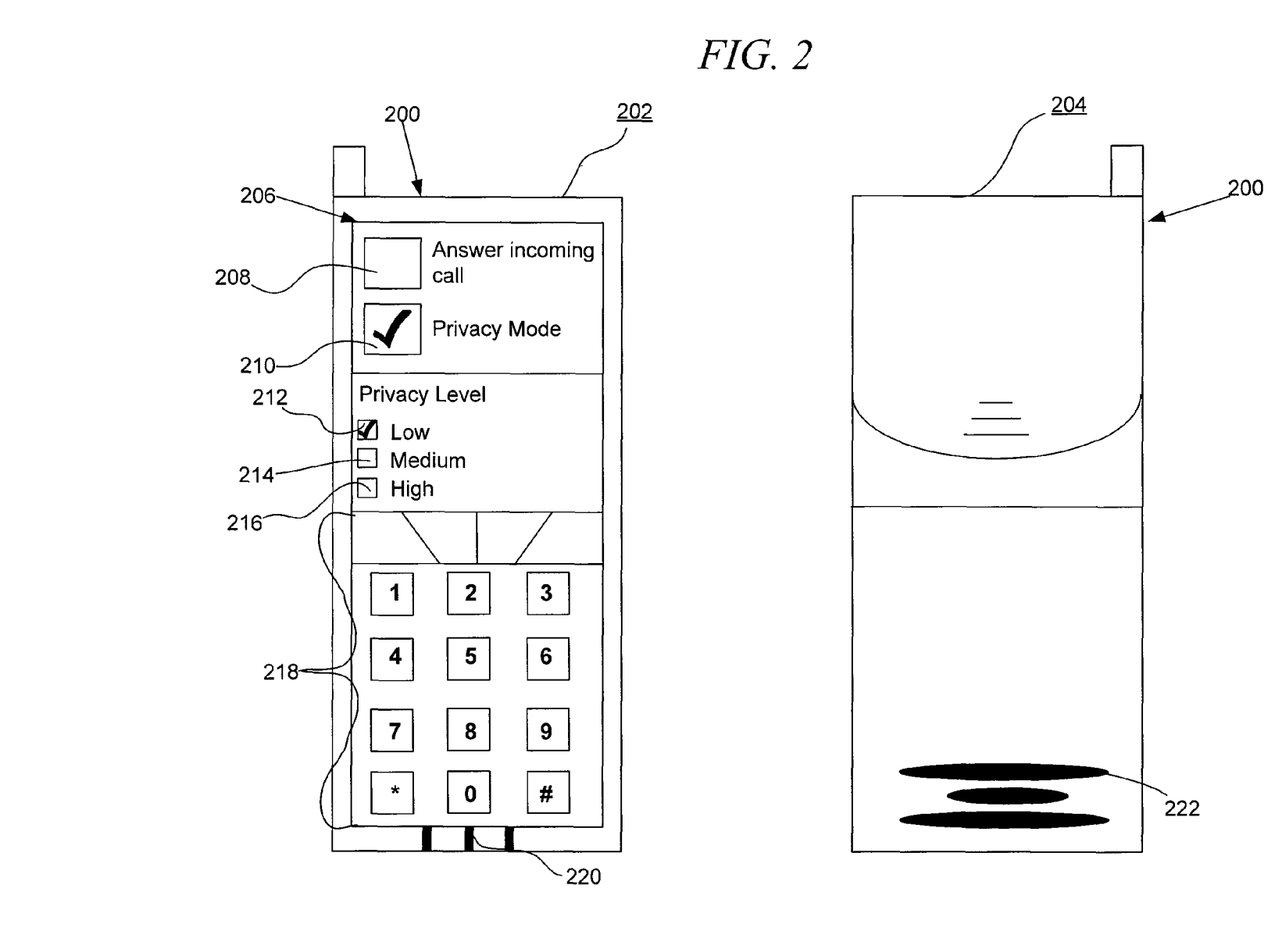
FIG. 2 illustrates views of a phone in accordance with an illustrative embodiment.
Figure 4:
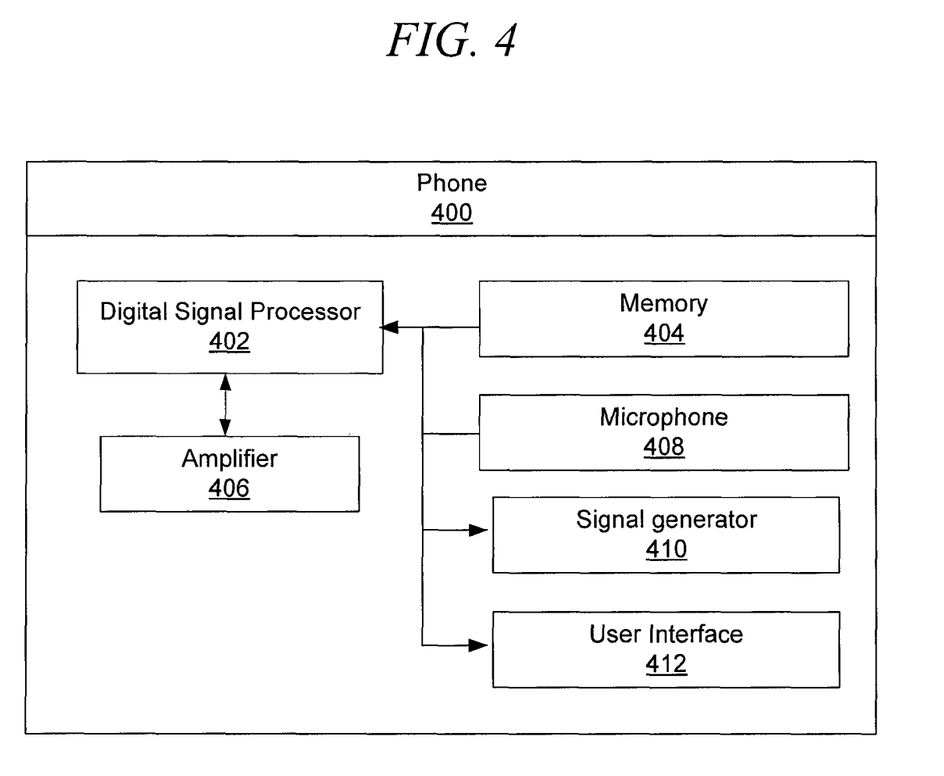
FIG. 4 is a block diagram of a phone for enhanced communication in accordance with an illustrative embodiment.

The noise cancellation hardware, software, and features of the phone are further described in FIGS. 2 and 4. The phone 102 may include one or more auditory input devices configured to receive sound, speech, and other audio input. The one or more microphones of the phone 102 may be strategically positioned on the phone in order to more effectively distinguish the voice communications 112 from the background noises 114. In another embodiment, one or more other telephones, headsets or devices may act as microphones to the phone 102. As shown, the phone 102 may include a cordless handset 104. The cordless handset 104 may similarly allow the user 106 to communicate through the phone. The cordless handset 104 allows the user 106 to send and receive short range wireless signals to the phone 102 within or in close proximity to the home 101.

The phone receives the audio input or audio signals including the voice communications 112 and the background noises 114 from one or more microphones and processes the incoming sounds or signals individually or as a group in order to generate an inverse signal of the background noises 114. The inverse signal may be a digital approximation of the background noises 114 received, with the exception that the inverse signal is out of phase with the background noises 114 received by the phone 102. In one embodiment, the inverse signal is 180 degrees out of phase with all the background noises 114 or signals received so that when aggregated to the combined signals received by the phone 102, the signals destructively interfere to reduce or eliminate the background noises 114.

The phone 102 may process the background noises 114 from the areas surrounding the user 106 to generate the inverse signal based on the amplitude, frequency, phase, and other characteristics of the background noises 114. The phase of the inverse signal may be tuned, based on analysis that may be performed by the noise phone 102, to ensure that destructive interference is occurring. In another embodiment, the background noises 114 may be received as direct input into the phone 102.

In one embodiment, the phone 102 may store a profile for one or more users. The profile is information regarding one or more users that utilize the phone 102. In one embodiment, the profile includes voice characteristics of the one or more users that are learned as each user utilizes the phone. The voice characteristics are the frequency, amplitude, pitch, speed, and other characteristics of the user's voice, common speech, and word usage. The profile may also compile an audio library of words spoken by the user which may include pronunciation, frequency, cadence, amplitude, and other distinguishable factors. The profile may be utilized to distinguish the voice communications 112 from the background noises 114 when generating the inverse signal.

The phone 102 may dynamically adjust the inverse signal that is broadcast based on changes in frequency, volume, and other voice and noise characteristics of the background noises 114 received by the one or more microphones of the phone 102. The noise cancellation features of the phone may be used to ensure that the receiving party 118 is able to hear the words and sounds communicated by the user 106 regardless of the audio happenings in the home 101.

FIG. 2 illustrates views of a phone in accordance with an illustrative embodiment. The phone 200 illustrates a particular implementation of the phone 102 or cordless handset 104 of FIG. 1. In particular, FIG. 2 illustrates a front view 202 and a rear view 204 of the phone 200. The phone 200 may include a display 206, buttons 208, 210, 212, 214, and 216, an interface 218, and microphones 220 and 222.

In one example, the phone 200 may be the handset of a cordless telephone system. The phone 200 may wirelessly communicate with a base station connected to a POTS or VoIP connection or link. The cordless telephone handset enabled with voice cancellation technology may include the same elements and features as the phone 200. Implementation of the phone 200 for a cordless telephone handset may provide additional security at a home or a business providing the various advantages herein described.

In one embodiment, the display 206 may be a touch screen display for receiving user input. The touch sensitive portions of the display 206 are referred to as buttons to simplify the description of the phone 200. The display 206 may display button 208 for allowing the user to answer or place a call, and button 210 for selecting a voice cancellation or privacy mode, feature or function. In one embodiment, once the user selects button 210, the buttons 212, 214, and 216 appear or are displayed for selecting a privacy level. In one embodiment, the user may select to distort a signal or to destructively interfere with a verbal conversation. The level of destructive interference may be linked with the privacy level.

The privacy level may be an amplitude or power output allotted to the voice cancellation feature. For example, when set to a low privacy mode, the phone 200 may transmit only an inverse signal that dampens the background noises received by the phone 200, rather than completely destructively interfering with the background noises. Similarly, at the highest level as selected by button 216, the phone 200 may be set to output the inverse signal at a strength or power level sufficient to completely destructively interfere with the background noises.

The user may also establish voice cancellation preferences for dialed or received calls for various contacts, area codes or phone numbers. For example, one or more phone numbers associated with the user's boss may be assigned the highest privacy level for ensuring that the conversation between the parties is as private as possible. In other cases, the voice cancellation preferences may specify that the voice cancellation feature is completely disabled because it is not needed or to preserve battery power.

The interface 218 may be used to perform the regular calling features of the wireless device and to receive user input. For example, the user may select one or more buttons within the interface 218, such as "*22" to activate a voice cancellation mode for the phone 200. Similarly, the interface 218 may allow the user to end the voice cancellation or call privacy at any time before, during or after voice communication.

The microphone 220 may be configured or located on the phone to receive the voice communications or signal as spoken by the user. For example, because the microphone 220 is on the front of the phone 200 closest to the user's mouth when utilizing the phone, the microphone 220 may more clearly pick up the voice input from the user. The microphone 220 communicates the voice communications as a voice signal to a processor and other logic and signal processing components of the phone 200 for generating the inverse signal. The microphone 222 may be located on the rear of the phone 200 in order to receive the background noises. Although both microphones receive background noises to some extent, the microphones 220 and 222 may be utilized to further distinguish the voice communications from the background noises. Additional microphones or devices with microphones may be connected to the phone 200 directly or through a network connection.

In one embodiment, the phone 200 and the display 206 may be configured to receive user input selecting a user profile or entering an identifier associated with the user. In other embodiments, the phone 200 may utilize a fingerprint, biometric or voice recognition to determine the user utilizing the phone 200 for voice communications. The profile may be utilized to generate the inverse signal and further filter the background noises received as audible inputs into the phone 200.

The display 206, buttons 208, 210, 212, 214, and 216, and interface 218 may include any number of configurations, interface elements, displays, touch screens, scroll wheels, and other elements for receiving user input and displaying information to the user.

Figure 3:
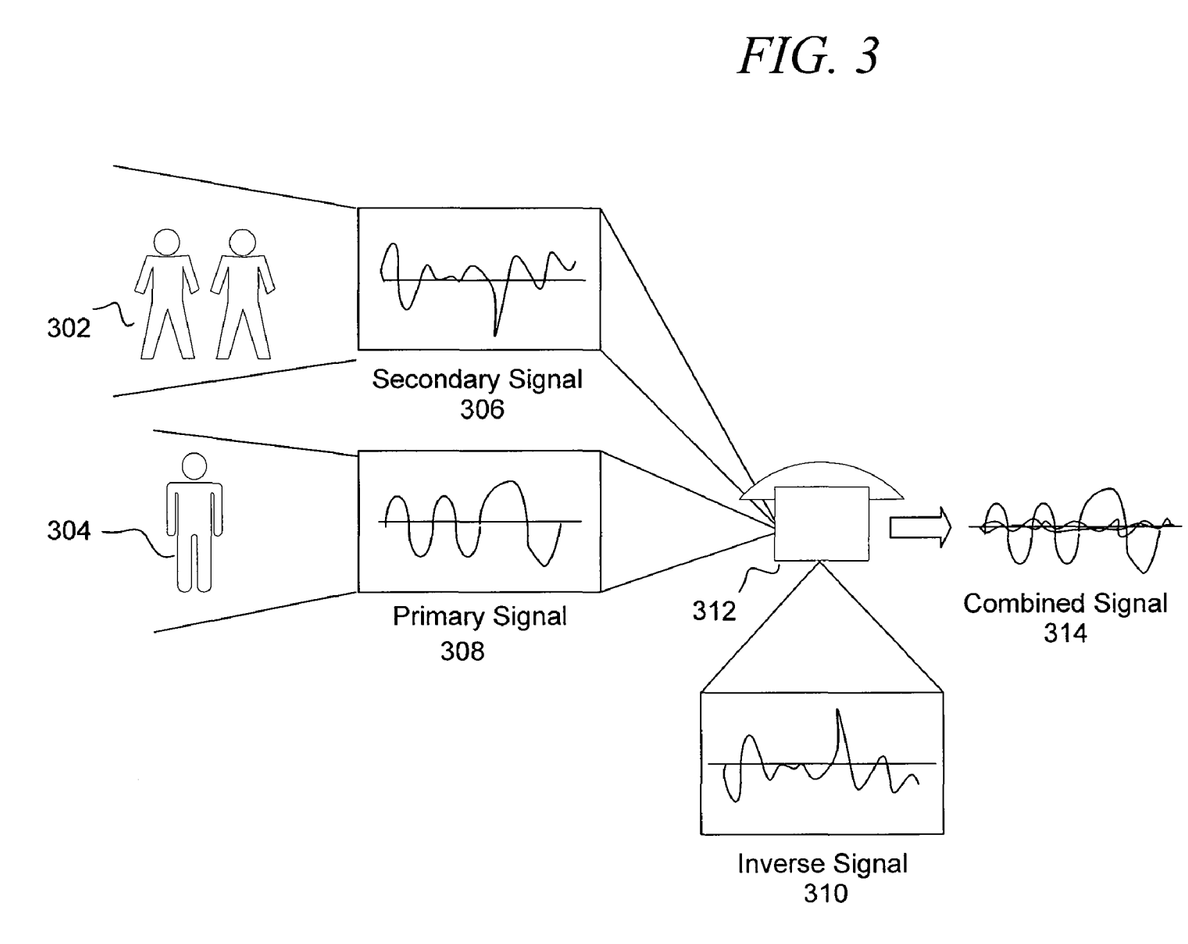
FIG. 3 is a pictorial representation of signals utilized by a phone for enhanced communication in accordance with an illustrative embodiment.

FIG. 3 is a pictorial representation of signals utilized by a phone for enhanced communication in accordance with an illustrative embodiment. FIG. 3 includes multiple signals that may be present in a conversation environment. FIG. 3 may include individuals 302, a user 304, a secondary signal 306, a primary signal 308, an inverse signal 310, phone 312, and combined signal 314. The various electronic signals are represented by a wave form to visually describe the illustrative embodiments.

The primary signal 308 represents the voice communications received from the user 304 utilizing the phone. The secondary signal 306 represents the background noises, in this example, generated by the individuals 302, that are also received by the phone. The secondary signal 306 may be sounds of individuals, machinery or other environment specific sounds. Although, shown distinctly for explanation purposes, it is important to note that the secondary signal 306 and the primary signal 308 may be a single signal or waveform received by one or more microphones of the phone 312. The secondary signal 306 and the primary signal 308 may vary in frequency and amplitude based on the loudness and types of sounds received by one or more microphones of the phone 312 from the individuals 302 and user 304.

The inverse signal 310 represents the signal generated by the phone to be added, aggregated, mixed or otherwise combined with the secondary signal 306 and primary signal 308 to destructively interfere with the secondary signal 306 or background noises. In one example, the inverse signal 310 is an approximation of the secondary signal 306 that is 180 degrees out of phase with the secondary signal 306. The inverse signal 310 may be an approximation due to the limitations and processing abilities of the noise cancellation and signal processing elements of the phone 312.

FIG. 4 is a block diagram of a phone for enhanced communication in accordance with an illustrative embodiment. FIG. 4 includes a phone 400 that may be a particular implementation of the phone 102 of FIG. 1. The phone 400 may include various elements including a digital signal processor 402, a memory 404, an amplifier 406, a microphone 408, a signal generator 410, and a user interface 412.

The phone 400 may be a combination of hardware and software elements which may be implemented using various structures and implementations. The example shown in FIG. 4 is given for illustration purposes only, and not as a limitation of required elements or a specified configuration. The phone 400 may be enabled to provide noise cancellation in order to enhance communications and privacy.

The digital signal processor 402 may be a signal processing device, noise cancellation logic, chipset, a signal generator or an amplifier. The digital signal processor 402 may also be any processing device suitable for processing speech, sound, noise, and communications signals. In another embodiment, the digital signal processor 402 may include other hardware and/or software implementing noise cancellation logic configured to generate and apply the inverse signal.

In particular, the digital signal processor 402 may include various pre-amplifiers, power amplifiers, digital-to-analog converters, and audio CODECs to dynamically generate an inverse signal to destructively interfere with the background noises. The digital signal processor 402 may alternatively be a digital logic or a noise cancellation program executed by a standard processor to analyze the incoming audio signals in order to generate the inverse signal for the background noises. In particular, the digital signal processor 402 may receive audio input or signals from the microphone 408. The digital signal processor 402 may also monitor the inverse signal so that the signal transmitted to a receiving party is not convoluted with portions of an inverse signal that do no not destructively interfere with the background noises.

The microphone 408 is one or more audio input devices configured to receive the audio input, voice communications, and noises from other areas or from an environment surrounding users of the phone 400. The microphone 408 electronically communicates the received signals to the digital signal processor 402. The digital signal processor 402 analyzes the received signals in order to generate the inverse signal for the background noises, such as inverse signal 310 of FIG. 3. In one embodiment, the microphone 408 may include a first microphone positioned to receive the voice input from a user and a second microphone positioned to receive background noises. In another embodiment, the background noises may be received through secondary phones in communication with the phone 400. The other phones equipped with microphones may communicate directly with the phone 400 or through a network. The signals from the phone may be sent directly to the phone 400 or routed through one or more other devices. The signals may represent the actual or anticipated background noises for use in generating one or more inverse signals.

Although not specifically shown, the phone 400 may include voice recognition logic. The voice recognition logic may be configured to recognize one or more users. For example, each family member within a home may be registered on the phone 400. The voice recognition logic may work with the signal generator 410, digital signal processor 402 or noise cancellation logic to ensure that the inverse signal destructively interferes with the background noises and not the user's voice that is intended for transmission to the receiving party. The voice recognition logic may compile and store voice characteristics of the user that specify typical voice frequencies, tones, inflection, accent, pauses, word usage, and other information. The voice characteristics, as well as a word or vocabulary library, may further ensure that the inverse signal only destructively interferes with the background noises. The voice recognition logic may use a dynamic filter of the voice frequencies to more clearly identify the background noises.

The amplifier 406 may be used to amplify or decrease the inverse signal to be added to the other voice signals. Since each person naturally speaks at a different volume level, the amplifier 406 adjusts the inverse signal as needed to destructively interfere with the background noise with maximum effectiveness. In one embodiment, a user may be able to set a privacy level for the phone 400. In some instances, the decision to select a specified privacy level may be based on the power output or signal amplitude required for the inverse signal to destructively interfere with the background noises detected by the microphone 408. The user may dial-in, adjust or select a privacy level based on the required level of privacy, current effectiveness of noise cancellation and how completely the user wants to attempt to cancel the background noises.

The memory 404 may be a static or dynamic storage medium, such as static random access memory, flash memory or dynamic random access memory. However, the memory 404 may be a hard disk, read-only memory or other suitable form or combination of volatile or nonvolatile memory. The memory 404 may store user preferences, voice characteristics, data, information, applications, and instructions for execution by the digital signal processor 402 to implement the noise cancellation functions of the phone 400. The user may establish noise cancellation preferences for dialed or received calls for various contacts, area codes or phone numbers. For example, one or more phone numbers associated with the user's supervisor may be assigned the highest privacy level for ensuring that the conversation between the parties is as private as possible. As a result, the phone 400 may be automatically activated and broadcast an inverse signal at full power when the user's supervisor is on the telephone.

The phone 400 may further include a user interface and display which may include buttons, a scroll wheel, knobs, a touch screen, and other interactive elements to allow the user to enter and receive information. For example, the user may use an interface to set user preferences for times during which the noise cancellation feature of the phone 400 is automatically activated. The user preferences may also include power settings, microphone configuration, activation controls, and other features.

The phone 400 may be integrated with a conference phone, soft phone, personal computer, server switch or other computing device or audio system to perform the noise cancellation features herein described. For example, the phone 400 may be an integrated part of a speaker telephone. The phone 400 may also be a software program within a personal computer that controls noise cancellation for one or more designated areas. By activating the noise cancellation application, the user may ensure privacy and effective communications within an area. In another embodiment, the elements, components, and features of the phone 400 may be integrated in a system or device that coordinates noise cancellation for one or more telephones.

Figure 5:
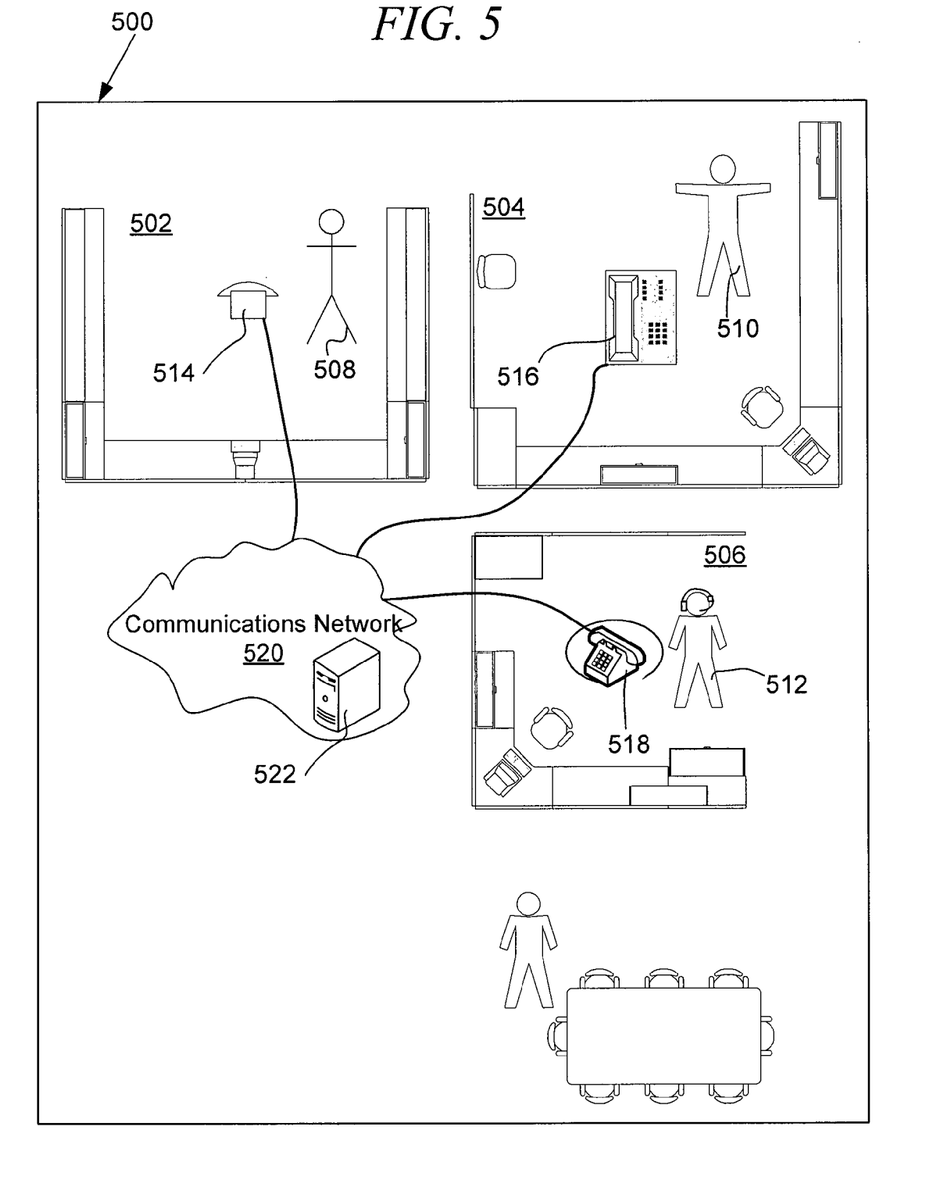
FIG. 5 is a pictorial representation of a call center utilizing noise cancellation in accordance with one embodiment.

FIG. 5 is a pictorial representation of a call center utilizing noise cancellation in accordance with one embodiment of the present invention. FIG. 5 illustrates one example of a call center 500, office environment, public area or other location in which many simultaneous conversations and sounds are intermingled. The call center 500 may include cubicles 502, 504, and 506, users 508, 510, and 512, telephones 514, 516, and 518, communications network 520, and noise cancellation server 522. The call center 500 is another example of the communications environment 100 of FIG. 1 utilizing a different configuration. The noise cancellation server 522 may include the components of the phone 400 of FIG. 4 and may be a server, switch, advanced intelligent network device, or other smart device.

The users 508, 510, and 512 represent one or more calling parties that may perform work or other tasks within the call center 500. The cubicles 502, 504, and 506 are the divisions or areas assigned to one or more of the users 508, 510, and 512 as well as other individuals. The cubicles may be rooms, dividers, desks, chairs or other elements that provide a work or call environment for the users 508, 510, and 512. Each of the users 508, 510, and 512 may have access to the telephones 514, 516, and 518, respectively.

The telephones 514, 516, and 518 may include telephonic devices as well as a headset that allows the users 508, 510, and 512 to carry on voice communications through the telephones 514, 516, and 518. The communications network 520 is the communications, systems, devices, and elements that are configured to enable voice and data communications through the telephones 514, 516, and 518. The communications network 520 may be a local area network or internal network that communicates with one or more other communications networks through one or more wireless or wired connections, lines, trunks or links.

In one embodiment, the network cancellation server 522 may coordinate noise cancellation for each of the telephones 514, 516, and 518. In another embodiment, the noise cancellation server 522 may provide input, such as a voice signal from each of the users 508, 510, and 512, that may be utilized by each of the phones 514, 416, and 518 to individually perform noise cancellation.

The noise cancellation server 522 may remove the background noises and conversations for the cubicle 502 by removing the voice, sound, and noise signals that are not received from the user 508. For example, the noise cancellation server 522 may utilize the signals received by the telephones 516 and 518 to generate an inverse signal that is applied to the signal received from the telephone 514 so that the receiving party may only receive signals from the user 508. A feedback loop, voice recognition logic, and a primary signal protector may be utilized to ensure that voice signals received from the user 508 are not cancelled by the inverse signal added to the connection between the telephone 514 and a receiving party by the noise cancellation server 522. The signals received through each of the telephones 514, 516, and 518 may be routed through the noise cancellation server 522 and as a result, the noise cancellation server may extract the signals for performing noise cancellation for one or more of the users 508, 510, and 512. The noise cancellation server 522 may also receive the signals through the communications network 520 in different configurations where the calls may not be routed through the noise cancellation server 522.

In another embodiment, the noise cancellation server 522 may send the voice signals received from the telephones 516 and 518 to the telephone 514. The telephone 514 may utilize the other signals to generate the inverse signal, filter the voice signal and otherwise process the voice signal received from the user 508 and transmitted to the receiving party. By utilizing the original signals received by each of the telephones 514, 516, and 518 the inverse signal may be more accurately generated and tailored to destructively interfere with the voice signals that propagate within the call center 500. Each of the microphones or headsets of the telephones 514, 516, and 518 may operate as a microphone for receiving the background noises to generate the inverse signal. The phones 514, 516, and 518 and/or the noise cancellation server 522 may apply the noise cancellation feature for all of the phones simultaneously. As a result, to one or more receiving parties communicating with the users 508, 510, and 512, the call center may seem like a quiet office environment rather than the functional call center 500 environment that it is.

The signals that are received by one or more of the phones 514, 516, 518 from the other phones in the call center 500 may be received in packets, streams, data or information through a direct connection or through the communications network 520. For example, voice communications that occur through the phones 514 and 516 may be sent to the phone 518 by the noise cancellation server 522 through the communications network 520. In another embodiment, the phones 514, 516, and 518 may utilize a wireless signal, such as WiFi or Bluetooth, to transmit their signals to the other phones to generate the inverse signal. The receipt of the signal directly by the phones 514, 516, and 518 or the network cancellation server 522 may allow the inverse signal to be more accurately generated and the background noises to be more carefully identified and separated from the desired voice communications.

The noise cancellation server 522 may adjust the amplitude or configuration of the voice signals sent to each of the phones 514, 516, and 518 based on distance between cubicles 502, 504, and 506 or phones 514, 516, and 518, propagation characteristics of the call center and/or other factors that may influence the generation of one or more inverse signals for destructive interference.

Figure 6:
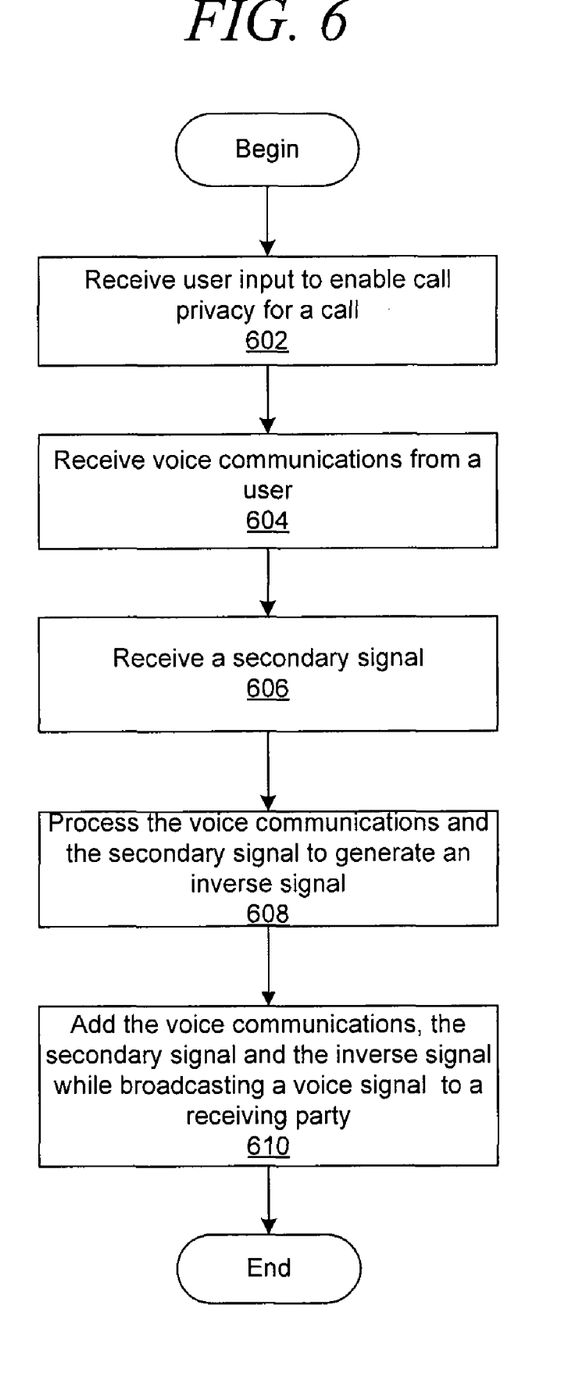
FIG. 6 is a flowchart of a process for enhancing communications in accordance with an illustrative embodiment.

FIG. 6 is a flowchart of a process for enhancing communications in accordance with an illustrative embodiment. The processes of FIGS. 6 and 7 may be implemented by a telephone, server, switch, device enabled for noise cancellation or other telephonic device generally referred to as a phone. The process may begin by receiving user input to enable call privacy for a call (step 602). The phone may be set by default to perform noise cancellation or may require a selection or other manual input from the user to activate a noise cancellation feature, mode or program. The call privacy function may be enabled anytime including during a conversation. A network device may receive the user input through a communications network Next, the phone receives voice communications from the user (step 604). During step 604, the user may speak to and carry on a verbal conversation with a receiving party or otherwise convey audible signals. The phone also receives a secondary signal (step 606). The secondary signals may be the noises or voice input that make up background noises within the primary signal referred to as the voice communications. The voice communications of step 604 and secondary signal of step 606 may be received separately or together. For example, one or more microphones that are part of the phone may receive all of the relevant audio signals. In another embodiment, the secondary signal may be received directly through other phones, a microphone network or a network device.

Next, the phone processes the voice communications and the secondary signal to generate an inverse signal (step 608). The inverse signal may be calculated or determined by a digital signal processor, noise cancellation logic or other processing element. The background noises have distinct characteristics including frequencies and amplitudes. In one embodiment, the inverse signal is an signal that mimics the background noises including the changing frequencies and amplitudes except that the inverse signal is 180 degrees out of phase with the signals/waves associated with the background noises.

Next, the phone adds the voice communications, the secondary signal, and the inverse signal while broadcasting a voice signal to a receiving party (step 610). In one embodiment, a small time delay may be utilized before broadcasting the signal received from the user to the receiving party. The time delay may enable the inverse signal to be aggregated with the other signals to allow the inverse signal to destructively interfere with the background noises before the combined signal is transmitted to the receiving party.

Figure 7:
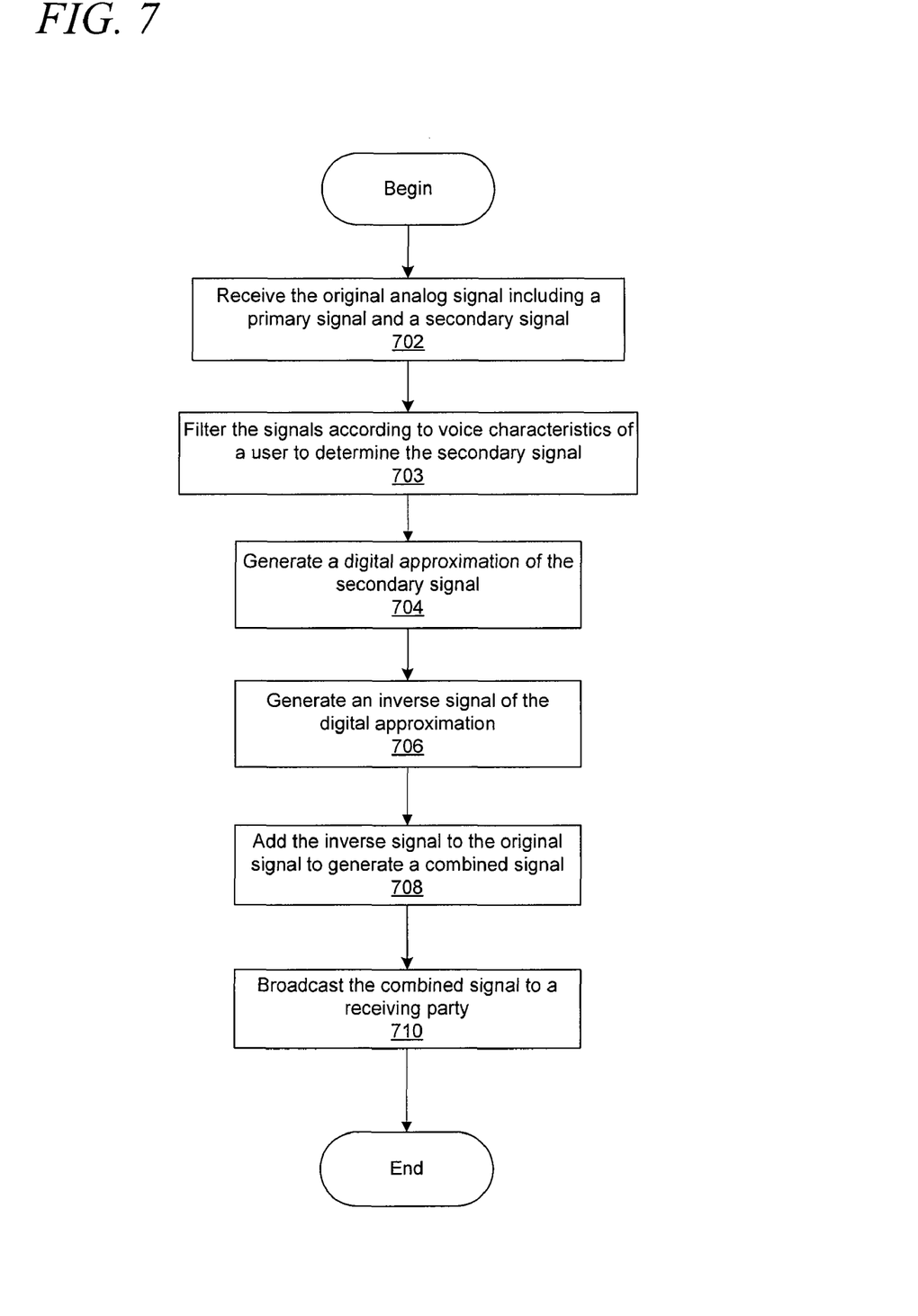
FIG. 7 is a flowchart of a process for generating an inverse signal for enhanced communications in accordance with an illustrative embodiment.

FIG. 7 is a flowchart of a process for generating an inverse signal for enhanced communications in accordance with an illustrative embodiment. The process may begin by receiving the original analog signal including a primary signal and a secondary signal (step 702). The primary signal may represent voice communications from the caller or user of the phone. The secondary signal may represent the background noises, waves or signals that need to be cancelled to enhance communications. The primary and secondary signal that make up the original signal may be received by the phone as a single input signal.

Next, the phone filters the signals according to voice characteristics of a user to determine the secondary signal (step 703). During step 703, previously measured, recorded or stored voice characteristics may be utilized to determine the secondary signal. The secondary signal may be determined to protect the primary signal from being cancelled. For example, the primary signal and secondary signal may be fully or partially separated for additional signal processing. As a result, the inverse signal may be generated as exclusively as possible based on the secondary signal.

Next, the phone generates a digital approximation of the secondary signal (step 704). The phone may use any number of pre-amplifiers, buffers or analog-to-digital converters to generate the digital approximation. The phone generates an inverse signal of the digital approximation (step 706). The inverse signal may be generated to destructively interfere with the secondary signal and not the primary signal.

Next, the phone adds the inverse signal to the original signal to generate a combined signal (step 708). The signals may be aggregated so that the inverse signal and secondary signal may destructively interfere leaving the primary signal as the most important part of the combined signal. Next, the phone broadcasts the combined signal to a receiving party (step 710). The combined signal may be communicated using traditional communications lines, networks, service providers, and equipments. A small delay may be added to the communications in order to allow the inverse signal to be generated and added to the original signal to destructively interfere with the background noises. In another embodiment, the noise cancellation features herein described may be applied to any number of wireless communications devices, such as cell phones.

The previous detailed description is of a small number of embodiments for implementing the invention and is not intended to be limiting in scope. The following claims set forth a number of the embodiments of the invention disclosed with greater particularity.

What is claimed:

1. A method for enhancing communications through a phone, the method comprising:
   receiving a voice communication from a user of the phone;
   identifying a receiving party of the voice communication from the user of the phone;
   based on identification of the receiving party, activating a noise cancellation feature of the phone;
   receiving a secondary signal from an environment in proximity to the phone;
   processing the secondary signal to determine an inverse signal in response to receiving the secondary signal; and
   combining the inverse signal with the voice communication and the secondary signal to destructively interfere with the secondary signal for allowing the receiving party to more effectively communicate with the user.

2. The method according to claim 1, wherein the receiving, processing, and combining are performed by a land line phone.

3. The method according to claim 2, wherein the land line phone is any of a plain old telephone system phone, voice over Internet Protocol phone, and a digital phone.

4. The method according to claim 1, wherein the receiving of the voice communication is performed by a first microphone and the receiving of the secondary signal is performed by a second microphone for distinguishing between the voice communication and other signals received by the phone.

5. The method according to claim 1, wherein the inverse signal combines with the voice communication and secondary signal before transmission from the phone to a receiving party to destructively interfere with the secondary signal.

6. The method according to claim 1, further comprising:
   buffering the voice communication and the secondary signal; and
   wherein the combining is performed before transmitting the voice communication to the receiving party.

7. The method according to claim 1, further comprising:
   receiving user input that enables the phone to generate the inverse signal for enhanced communications with the receiving party.

8. The method according to claim 1, wherein the voice communication and the secondary signal are received as a single signal by the phone, and wherein the inverse signal is a digital approximation of the secondary signal and 180 degrees out of phase with the secondary signal.

9. The method according to claim 1, wherein the user may specify the level of sensitivity to adjusting the amplitude of the inverse signal during the voice communication.

10. The method according to claim 1, further comprising:
    receiving the secondary signal from one or more other phones in communication with the phone;
    adjusting a signal strength of the inverse signal to match an amplitude of the secondary signal.

11. The method according to claim 1, further comprising:
    automatically activating the noise cancellation feature of the phone to generate the inverse signal and combine the inverse signal with the secondary signal based on usage of the phone.

12. The method according to claim 1, further comprising:
    learning voice characteristics of one or more users that utilizes the phone;
    receiving an indication of the one or more users utilizing the phone; and
    filtering the secondary signal using the voice characteristics to retain the voice communication of the user.

13. A phone for reducing background noises, the phone comprising:
    one or more microphones operable to receive voice communications from a user and background noises from an environment of the phone;
    a processor configured to identify a receiving party of the voice communications from the user and, based on identification of the receiving party, activate a noise cancellation feature of the phone; and
    a signal generator in communication with the microphone and the processor, the signal generator configured, upon activation of the noise cancellation feature, to process the background noises to determine an inverse signal of the background noises, and combine the voice communications, the background noises, and the inverse signal into a combined signal, and the signal generator transmits the combined signal to the receiving party.

14. The phone according to claim 13, wherein the phone receives the background noises from a plurality of phones in communication with the phone to generate the inverse signal.

15. The phone according to claim 13, further comprising:
    an amplifier operable to adjust the inverse signal to an amplitude sufficient to destructively interfere with the background noises.

16. The phone according to claim 15, further comprising:
    a display operable to receive a user selection commanding the signal generator to generate the inverse signal and an intensity level for the amplitude.

17. The phone according to claim 13, wherein the signal generator further includes logic for learning voice characteristics of one or more users that utilizes the phone, and wherein the inverse signal destructively interferes with parts of a combined signal including the voice communication and background noise that are different from the voice characteristics.

18. A phone for reducing background noises, the phone comprising:
    a processor operable to execute a set of instructions;
    a memory in communication with the processor, the memory operable to store the set of instructions, the set of instructions are operable to:
      receive a voice communication from a user of the phone;
      identify a receiving party of the voice communication from the user of the phone;
      based on identification of the receiving party, activate a noise cancellation feature of the phone;
      receive a secondary signal from an environment in proximity to the phone;
      process the secondary signal to determine an inverse signal in response to receiving the secondary signal; and
      combine the inverse signal with the voice communication and the secondary signal to destructively interfere with the secondary signal for allowing the receiving party to more effectively communicate with the user.

19. The phone according to claim 18, wherein the set of instructions is implemented by a network device in communication with the phone, and wherein the secondary signal is received from a plurality of phones in communication with the phone.

20. The phone according to claim 19, wherein the set of instructions further:
    learns voice characteristics of the user and stores the voice characteristics in the memory;
    wherein the inverse signal does not destructively interfere with the voice characteristics of the user included in a combined signal of the voice communication and the secondary signal.

* * * * *